United States Patent
Morita

(10) Patent No.: US 11,621,653 B2
(45) Date of Patent: Apr. 4, 2023

(54) CONTROLLER CAPABLE OF STOPPING CONTROL TARGET IN SHORT TIME, VIBRATION ACTUATOR, IMAGE CAPTURE APPARATUS, AND CONTROL METHOD

(71) Applicant: CANON KABUSHIKI KAISHA, Tokyo (JP)

(72) Inventor: Hiromitsu Morita, Ageo (JP)

(73) Assignee: Canon Kabushiki Kaisha, Tokyo (JP)

(*) Notice: Subject to any disclaimer, the term of this patent is extended or adjusted under 35 U.S.C. 154(b) by 331 days.

(21) Appl. No.: 16/920,932

(22) Filed: Jul. 6, 2020

(65) Prior Publication Data
US 2021/0021211 A1 Jan. 21, 2021

(30) Foreign Application Priority Data
Jul. 18, 2019 (JP) .............................. JP2019-132793

(51) Int. Cl.
*H02N 2/00* (2006.01)
*G03B 13/34* (2021.01)
*H02N 2/14* (2006.01)
*H02N 2/06* (2006.01)
*G03B 3/10* (2021.01)

(52) U.S. Cl.
CPC ............... *H02N 2/001* (2013.01); *G03B 3/10* (2013.01); *G03B 13/34* (2013.01); *H02N 2/06* (2013.01); *H02N 2/14* (2013.01)

(58) Field of Classification Search
CPC ............ H02N 2/001; H02N 2/06; H02N 2/14; H02N 2/026; H02N 2/062; H02N 2/142; H02N 2/0015; G03B 3/10; G03B 13/34; G03B 2205/0061
See application file for complete search history.

(56) References Cited

U.S. PATENT DOCUMENTS

| 9,823,547 B2 | 11/2017 | Morita |
| 10,871,700 B2* | 12/2020 | Ashizawa ................ G02B 7/04 |
| 2005/0253485 A1* | 11/2005 | Kishi .................. H01L 41/0913 |
| | | 310/323.16 |
| 2006/0113867 A1* | 6/2006 | Sakatani ................ H02N 2/103 |
| | | 310/323.17 |
| 2016/0329836 A1* | 11/2016 | Sumioka ................ H02N 2/142 |
| 2017/0017137 A1* | 1/2017 | Morita ..................... G03B 3/10 |

FOREIGN PATENT DOCUMENTS

JP 2017-022941 A 1/2017

* cited by examiner

*Primary Examiner* — Emily P Pham
(74) *Attorney, Agent, or Firm* — Venable LLP

(57) ABSTRACT

A controller is capable of reducing time required to stop a control target at a target stop position as a final stop position. The controller drives a vibration element including a piezoelectric element by an AC signal to thereby move a contact body, in contact with the vibration element, relative to the vibration element. The controller controls a pulse duty cycle of a signal converted to the AC signal based on a difference between a target stop position, which is a final stop position of the contact body, and a current position of the contact body, and an actual speed of the contact body.

13 Claims, 10 Drawing Sheets

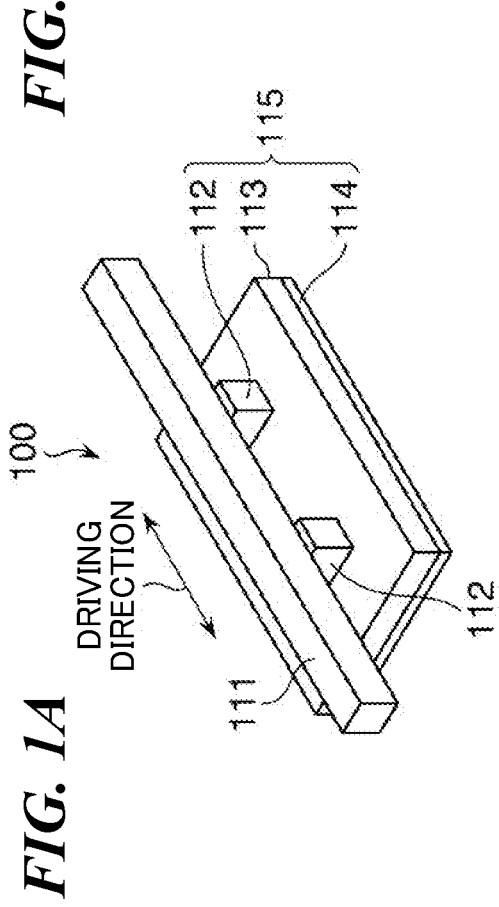
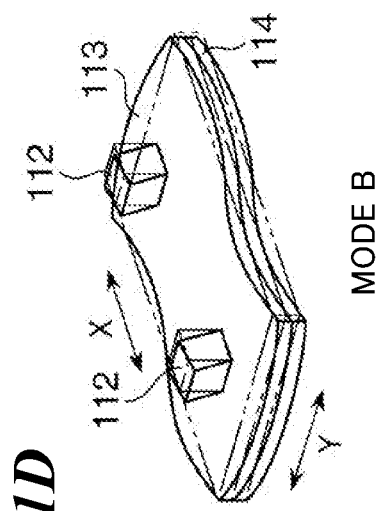
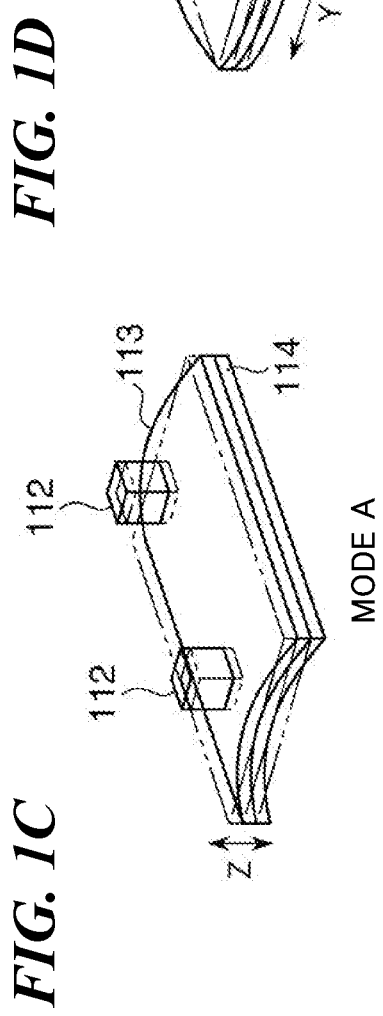

CONTROLLER CAPABLE OF STOPPING CONTROL TARGET IN SHORT TIME, VIBRATION ACTUATOR, IMAGE CAPTURE APPARATUS, AND CONTROL METHOD

BACKGROUND OF THE INVENTION

Field of the Invention

The present invention relates to a controller capable of stopping a control target in a short time, a vibration actuator including the controller, an image capture apparatus including the vibration actuator, and a control method.

Description of the Related Art

Conventionally, there have been proposed various techniques concerning a vibration actuator including a vibration element that is moved relative to a contact body by elliptical motion generated at a predetermined point of mass. Particularly, in recent years, there is a demand for moving an object with a large inertia using the vibration actuator.

However, the object with a large inertia is difficult to be stopped at a desired position and is liable to pass (overshoot) a target stop position as a final stop position, without stopping there. If overshoot occurs, it takes a long time to stop the object at the target stop position.

Therefore, to properly stop an object, various types of deceleration means have been proposed. For example, Japanese Laid-Open Patent Publication (Kokai) No. 2017-22941 discloses a drive device for a vibration actuator, which is configured to control the elliptical motion not only according to a difference between a command position and a detected position, but also according to a difference between a final target position and the detected position.

According to the technique disclosed in Japanese Laid-Open Patent Publication (Kokai) No. 2017-22941, however, there is a possibility that speed control of the vibration actuator is not properly performed. For example, depending on environmental conditions (such as influence of water and increase in load, in a high-humidity environment or a low-temperature environment) of the vibration actuator, a desired drive speed cannot be realized due to slip between the contact body and the vibration element, so that it sometimes takes a long time to stop the object.

SUMMARY OF THE INVENTION

The present invention provides a controller capable of reducing time required to stop a control target at a target stop position as a final stop position, a vibration actuator including the controller, an image capture apparatus including the vibration actuator, and a control method.

In a first aspect of the present invention, there is provided a controller that drives a vibration element including an electromechanical energy conversion element by an AC signal to thereby move a contact body which is in contact with the vibration element relative to the vibration element, wherein the controller is configured to control a pulse duty cycle of a signal converted to the AC signal based on a difference between a target stop position which is a final stop position of the contact body and a current position of the contact body, and an actual speed of the contact body.

In a second aspect of the present invention, there is provided a vibration actuator including a vibration element, and a controller which is configured to control driving of the vibration element.

In a third aspect of the present invention, there is provided a vibration actuator including a contact body formed into an annular shape, a plurality of vibration elements arranged at substantially equally-spaced intervals in a circumferential direction of the contact body, and a controller which is configured to control driving of each vibration element, wherein control of driving of each vibration element by the controller causes the contact body to rotate relative to the vibration elements.

In a fourth aspect of the present invention, there is provided an image capture apparatus which includes a lens barrel or is capable of having a lens barrel attached thereto, including an image capture device arranged on an optical axis of the lens barrel, and a vibration actuator, as the second aspect of the present invention, which is configured to drive a lens included in the lens barrel.

In a fifth aspect of the present invention, there is provided an image capture apparatus which includes a lens barrel or is capable of having a lens barrel attached thereto, including an image capture device arranged on an optical axis of the lens barrel, and a vibration actuator, as the third aspect of the present invention, which is configured to drive a lens included in the lens barrel.

In a sixth aspect of the present invention, there is provided a control method for driving a vibration element including an electromechanical energy conversion element by an AC signal to thereby move a contact body which is in contact with the vibration element relative to the vibration element, comprising controlling a pulse duty cycle of a signal converted to the AC signal based on a difference between a target stop position which is a final stop position of the contact body and a current position of the contact body, and an actual speed of the contact body.

According to the present invention, the pulse duty cycle is controlled based not only on a difference between the target stop position and the current position, but also on the actual speed, and hence it is possible to reduce time required to stop the object at the target stop position.

Further features of the present invention will become apparent from the following description of exemplary embodiments (with reference to the attached drawings).

BRIEF DESCRIPTION OF THE DRAWINGS

FIGS. 1A to 1D are views useful in explaining a relative movement unit of a vibration actuator according to a first embodiment of the present invention.

DESCRIPTION OF THE EMBODIMENTS

Figure 2A:
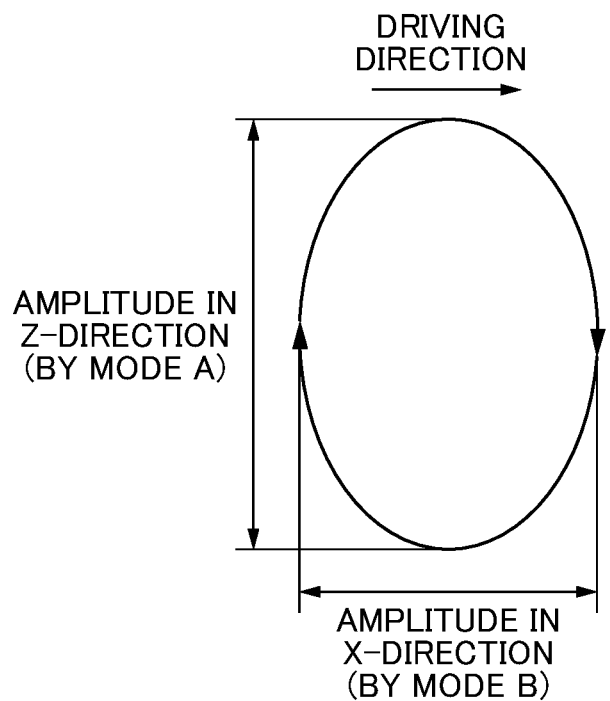
FIGS. 2A and 2B are diagrams useful in explaining a driving operation of a vibration element of the vibration actuator.

The present invention will now be described in detail below with reference to the accompanying drawings showing embodiments thereof.

The embodiments described below are only examples of configurations that can realize the present invention. The following embodiments can be modified or changed according to the configuration of an apparatus to which the present invention is applied and various conditions, on an as needed basis. Therefore, the scope of the present invention is not limited to the configurations of the following embodiments described hereafter. For example, a configuration formed by combining a plurality of configurations described in the following embodiments may be employed insofar as there is no inconsistency between them.

In the following description of the embodiments, a "vibration actuator" includes a "vibration element", a "contact body", and a "controller", and the "vibration element" includes a "resilient body" and an "electromechanical energy conversion element (piezoelectric element)".

A relative movement unit 100 of a vibration actuator 30, described hereinafter, according to a first embodiment of the present invention will be described with reference to FIGS. 1A to 1D. The relative movement unit 100 is driven by a drive controller 301, described hereinafter.

FIG. 1A is a perspective view of the relative movement unit 100. The relative movement unit 100 includes a contact body 111 and a vibration element 115. The vibration element 115 includes two protrusions 112, a resilient body 113, and a piezoelectric element 114. The resilient body 113 is made of a metallic material which formed into a substantially plate shape. The piezoelectric element 114 is an electromechanical energy conversion element bonded to one surface (first surface) of the resilient body 113. The two protrusions 112 are provided on the other surface (second surface opposite to the first surface) of the resilient body 113. The contact body 111 and the two protrusions 112 of the vibration element 115 are brought into pressure contact with each other by pressing means, not shown.

FIG. 1B is a plan view showing the schematic structure of the piezoelectric element 114. FIG. 1C is a view useful in explaining a first vibration mode (hereinafter referred to as the "mode A") excited in the vibration element 115. FIG. 1D is a view useful in explaining a second vibration mode (hereinafter referred to as the "mode B") excited in the vibration element 115. In the vibration element 115, a direction of a straight line connecting between the two protrusions 112 is defined as an X-direction, a direction of the thickness of the resilient body 113, which is orthogonal to the X-direction, is defined as a Z-direction, and a direction orthogonal to the X-direction and the Z-direction is defined as a Y-direction.

As shown in FIG. 1B, the piezoelectric element 114 has two electrodes formed on one surface thereof such that they divide the whole area of the one surface into two substantially equal parts in a longitudinal direction, i.e., in the X-direction and are polarized in the same direction (+). On the other surface of the piezoelectric element 114, there is formed one common electrode (full surface electrode). An alternating voltage VB is applied to one of the two electrode areas formed on the one surface of the piezoelectric element 114, which is on the right side as viewed in FIG. 1B, and an alternating voltage VA is applied to the electrode area on the left side as viewed in FIG. 1B.

In a case where the frequencies of the alternating voltages VB and VA are around the resonance frequency of the mode A and also the alternating voltages VB and VA are in the same phase, the whole piezoelectric element 114 (two electrode areas) extends at some time point and contracts at another time point. As a result, the vibration of the mode A, shown in FIG. 1C, is generated in the vibration element 115. The mode A is a primary out-of-plane bending vibration mode in which two nodes appear in the vibration element 115 substantially in parallel with the X-direction.

On the other hand, in a case where the frequencies of the alternating voltages VB and VA are around the resonance frequency of the mode B and also a phase shift (phase difference) between the alternating voltages VB and VA is 180°, the electrode area of the piezoelectric element 114 on the right side as viewed in FIG. 1B contracts whereas the electrode area on the left side as viewed in FIG. 1B extends at some time point. At another time point, the extension and contraction occurs in an opposite relationship to the above. As a result, the vibration of the mode B, shown in FIG. 1D, is generated in the vibration element 115. The mode B is a secondary out-of-plane bending vibration mode in which three nodes appear in the vibration element 115 substantially in parallel with the Y-direction.

The driving operation of the vibration element 115 of the vibration actuator 30 according to the first embodiment will be described with reference to FIGS. 2A and 2B.

FIG. 2A is a diagram useful in explaining elliptical motion excited at each of tip ends of the protrusions 112. The two protrusions 112 are disposed at or around respective positions corresponding to antinodes of the vibration of the mode A and also at or around respective positions corresponding to nodes of the vibration of the mode B. For this reason, the tip end of each protrusion 112 is caused to reciprocally move in the X-direction through pendulum motion by the vibration of the mode A with its node as a fulcrum and is caused to reciprocally move in the Z-direction by the vibration of the mode B. Therefore, by simultaneously exciting and superimposing the vibrations of the modes A and B such that the vibration phase difference between the modes A and B is around $\pm\pi/2$, it is possible to generate elliptical motion within a Z-X plane at the tip end surfaces of the protrusions 112.

While the above-described elliptical motion is being generated, a frictional force generated by pressure contact is acting between the two protrusions 112 and the contact body 111. Therefore, the elliptical motion of the protrusions 112 produces a driving force (thrust) for moving the vibration element 115 and the contact body 111 relative to each other in the X-direction (driving direction). That is, the protrusions 112 function as a driving section for moving the vibration element 115 and the contact body 111 relative to each other.

Hereafter, a ratio of amplitudes of the elliptical motion generated at the tip ends of the protrusions 112, shown in FIG. 2A, in the Z-direction and in the X-direction is defined as the ellipse ratio of the elliptical motion. In the following description, it is assumed that the vibration element 115 of the relative movement unit 100 is fixed whereas the contact body 111 of the same is driven in the X-direction. Note that the relative movement unit 100 may be configured such that the contact body 111 is fixed and the vibration element 115 itself is moved in the X-direction by driving the vibration element 115. A term concerning "speed" in the present invention indicates a relative moving speed between the contact body 111 and the vibration element 115.

Figure 2B:
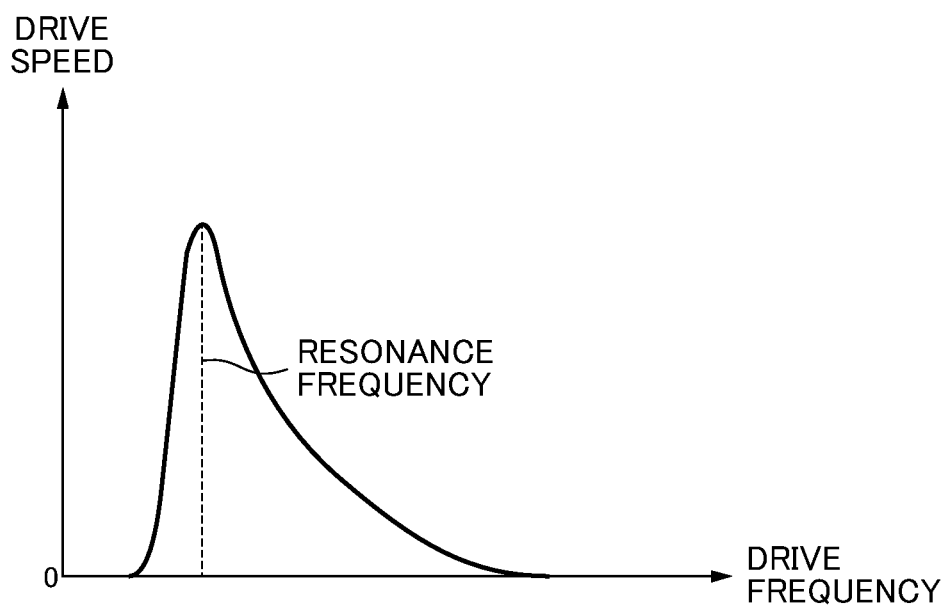

FIG. 2B is a diagram showing a relationship between the drive frequency and the drive speed (relative moving speed between the vibration element 115 and the contact body 111) in the relative movement unit 100. As shown in FIG. 2B, the drive speed takes a peak value when driving the relative movement unit 100 at the resonance frequency of the relative movement unit 100. Further, the drive speed is gently reduced as the frequency is further away from the resonance frequency in a frequency range on a higher side of the resonance frequency, whereas in a frequency range on a lower side of the resonance frequency, the drive speed is steeply reduced as the frequency is further away from the resonance frequency.

By changing drive frequency of the piezoelectric element 114 (frequency of the alternating voltage applied to the piezoelectric element 114) based on the above-described characteristics, it is possible to change the magnitude of the elliptical motion while maintaining the ellipse ratio. For example, as the drive frequency is made closer to the resonance frequency of the relative movement unit 100, it is possible to make the elliptical motion larger to increase the drive speed. On the other hand, as the drive frequency is made farther from the resonance frequency of the relative movement unit 100, it is possible to make the elliptical motion smaller to reduce the drive speed.

Figure 3A:
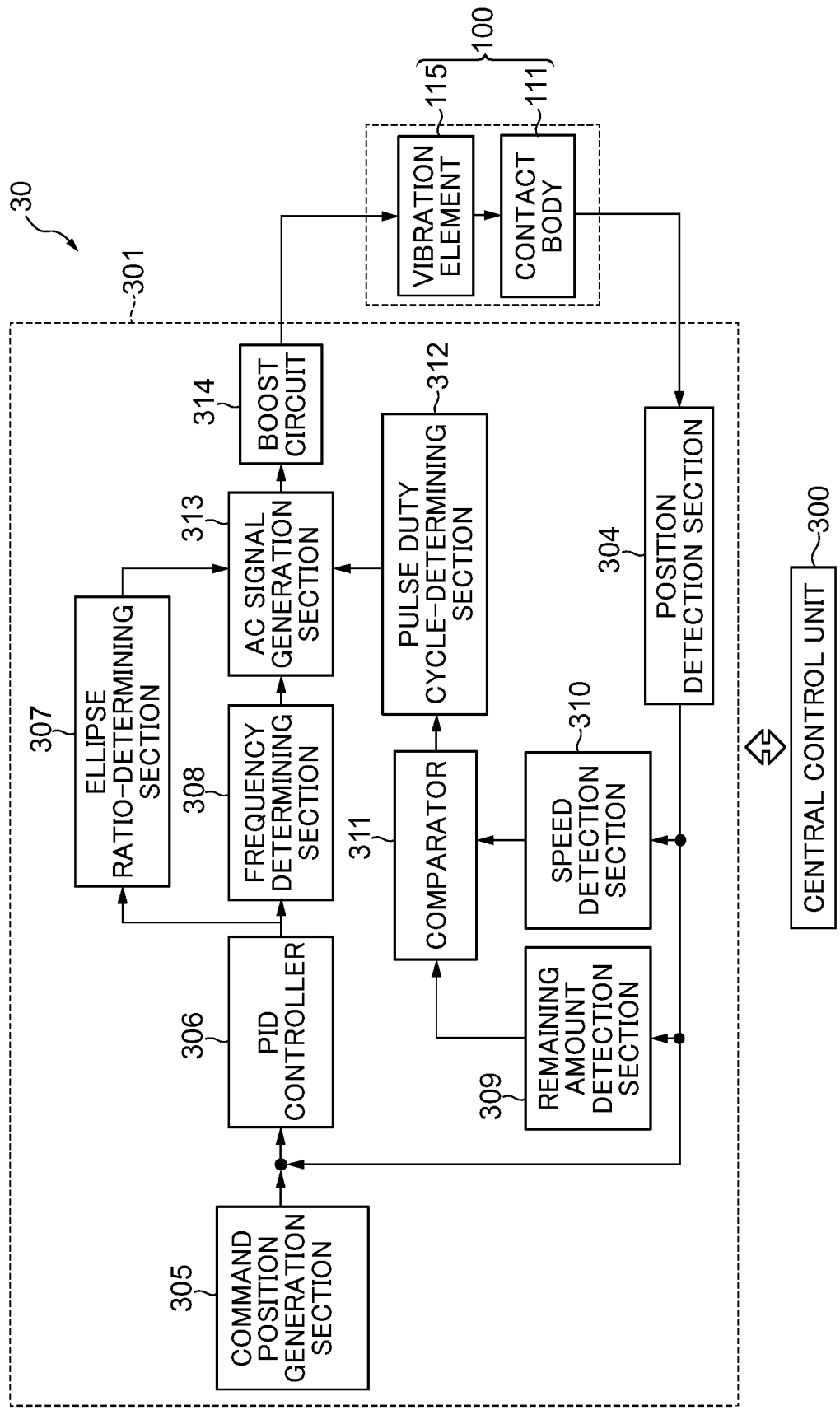
FIG. 3A is a block diagram of the vibration actuator.

The vibration actuator 30 according to the first embodiment will be described with reference to FIGS. 3A and 3B. The vibration actuator 30 includes the relative movement unit 100, a central control unit 300, and the drive controller (controller) 301. FIG. 3A is a block diagram schematically showing the configuration of the drive controller 301 and associated elements.

The relative movement unit 100 (the vibration element 115 and the contact body 111) is as described above with reference to FIG. 1.

The central control unit 300 and the drive controller 301 each are a so-called microcomputer, and each include a central processing unit (CPU), a memory storing programs, such as a ROM, and a memory as a work area into which the programs are loaded, such as a RAM. The central control unit 300 controls the overall operation of the vibration actuator 30 by executing a predetermined program stored, e.g., in its ROM. The drive controller 301 controls the operation of the relative movement unit 100 by executing a predetermined program stored, e.g., in its ROM in cooperation with the central control unit 300.

The drive controller 301 includes a position detection section 304, a command position generation section 305, a PID controller 306, an ellipse ratio-determining section 307, a frequency determining section 308, a remaining amount detection section 309, a speed detection section 310, a comparator 311, a pulse duty cycle-determining section 312, an AC signal generation section 313, and a boost circuit 314. The components of the drive controller 301 each perform a specific operation according to an output (control signal) from the central control unit 300.

The position detection section 304 is an element for detecting a relative position of the contact body 111 and is, e.g., an encoder. The position detection section 304 outputs a signal indicative of the detected current position (detected position) of the contact body 111.

The command position generation section 305 outputs a signal indicative of a command position used for movement control of the contact body 111. The command position is a target position of the contact body 111, which changes with time, and is a target value used for position control for moving the contact body 111 to a final stop position.

A signal indicative of a difference (deviation) between a detected position of the contact body 111, which is output from the position detection section 304, and a command position output from the command position generation section 305 is input to the PID controller 306. The PID controller 306 calculates an operation amount of the vibration element 115 based on the difference between the position of the contact body 111 and the command position. The PID controller 306 outputs a signal indicative of the operation amount to the ellipse ratio-determining section 307 and the frequency determining section 308.

The ellipse ratio-determining section (phase difference-determining section) 307 determines an ellipse ratio of elliptical motion to be excited at the protrusions 112 of the vibration element 115, based on the operation amount input from the PID controller 306. The ellipse ratio corresponds to a phase difference between the alternating voltages VA and VB applied to the piezoelectric element 114. An upper limit value of the phase difference is set to, e.g., 90°. In a case where the driving direction is reverse, a lower limit value of the phase difference is set to, e.g., −90°. The ellipse ratio-determining section 307 outputs a signal indicative of the determined ellipse ratio to the AC signal generation section 313.

The frequency determining section 308 determines the drive frequency of the piezoelectric element 114 based on the operation amount input from the PID controller 306. As mentioned above, the size of the ellipse of the elliptical motion excited at the protrusions 112 of the vibration element 115 changes with a change in the drive frequency. The frequency determining section 308 outputs a signal indicative of the determined drive frequency to the AC signal generation section 313.

The remaining amount detection section 309 calculates a drive remaining amount which is a difference between the final stop position of the contact body 111 and the detected position of the contact body 111 output from the position detection section 304, and outputs the calculated drive remaining amount to the comparator 311. The speed detection section 310 calculates a drive speed based on an amount of change in the detected position of the contact body 111 output from the position detection section 304, and outputs the calculated drive speed to the comparator 311.

The comparator 311 compares the input drive remaining amount and drive speed with respective predetermined values (threshold values). The pulse duty cycle-determining section 312 determines a pulse duty cycle of the AC signal (pulse duty cycle of a signal converted to the AC signal) according to a result of the comparison performed by the comparator 311 and outputs a signal indicative of the determined pulse duty cycle to the AC signal generation section 313. Details of processing by the comparator 311 and the pulse duty cycle-determining section 312 will be described hereinafter.

The AC signal generation section 313 is an element that generates a two-phase AC signal for driving the vibration element 115 (piezoelectric element 114) and is, e.g., a driver circuit that generates an AC signal by a switching operation. The operation of the AC signal generation section 313 is controlled according to inputs from the ellipse ratio-determining section 307, the frequency determining section 308, and the pulse duty cycle-determining section 312. The AC signal generation section 313 outputs the AC signal to the boost circuit 314.

Figure 3B:
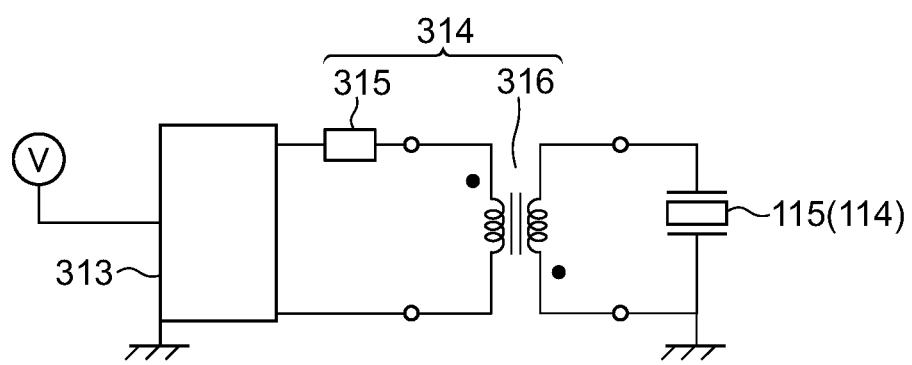
FIG. 3B is a circuit diagram useful in explaining a boost circuit appearing in FIG. 3A.

The boost circuit 314 has a coil 315 and a transformer 316 as shown in FIG. 3B. The two-phase AC signal input to the boost circuit 314 is boosted by the coil 315 and the transformer 316 and is applied to the electrodes of the piezoelectric element 114.

In the present embodiment, in a case where the phase difference corresponding to the ellipse ratio determined by the ellipse ratio-determining section 307 does not reach the upper limit value or the lower limit value (when the drive speed is low), the drive frequency is set to the upper limit value. The AC signal generation section 313 generates a two-phase AC signal having the phase difference determined by the ellipse ratio-determining section 307 and the drive frequency set to the upper limit value. The expression "the drive frequency is set to the upper limit value" is intended to mean that the drive frequency is set to the maximum value or a value close to the maximum value within a drive frequency band used for driving the vibration element 115. On the other hand, in a case where the phase difference corresponding to the ellipse ratio determined by the ellipse ratio-determining section 307 reaches the upper limit value or the lower limit value (when the drive speed is high), the AC signal generation section 313 generates a two-phase AC signal having the phase difference determined by the ellipse ratio-determining section 307 and the drive frequency determined by the frequency determining section 308.

A control process for controlling the operation of the relative movement unit 100 caused by the vibration actuator 30 will be described with reference to FIGS. 4, 5A and 5B.

Figure 4:
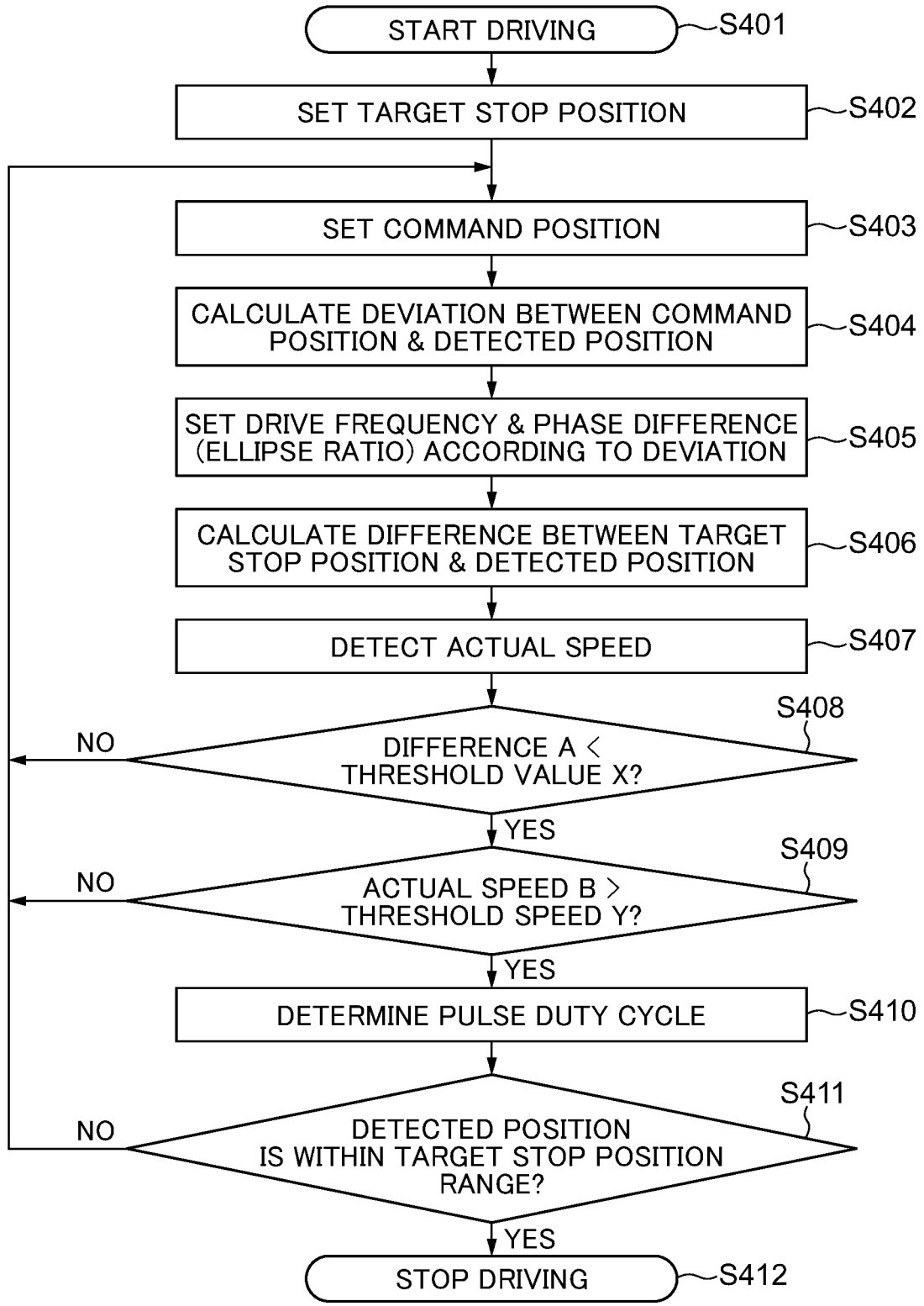
FIG. 4 is a flowchart of a control process for controlling an operation of the relative movement unit of the vibration actuator.

FIG. 4 is a flowchart of the control process for controlling the operation of the relative movement unit 100 caused by the vibration actuator 30. The control process in FIG. 4 is realized by the central control unit 300 that controls the operations of the components of the drive controller 301 by executing a predetermined program. FIGS. 5A and 5B are diagrams showing relationships between the difference (drive remaining amount) and the drive speed, which are values to be compared with the respective predetermined values by the comparator 311, and the pulse duty cycle.

In a step S401, the central control unit 300 applies an AC signal to the piezoelectric element 114 to start the control operation.

In a step S402, the central control unit 300 sets a target stop position as a position where the contact body 111 is to be finally stopped.

In a step S403, the command position generation section 305 sets a command position as a temporary target position of the contact body 111, which changes with time, based on the target stop position, for each unit time (e.g., Δt).

In a step S404, a difference (deviation) between a detected position (current position) of the contact body 111, which has been detected by the position detection section 304, and the command position output from the command position generation section 305 is calculated. The deviation may be calculated by the main unit (microcomputer) of the drive controller 301 (no differential circuit is specifically shown in FIG. 3A for this reason) or may be calculated by the PID controller 306.

In a step S405, the PID controller 306 performs feedback control so as to move the relative movement unit 100 (contact body 111) to the command position based on the deviation calculated in the step S404.

The feedback control includes acceleration control for increasing the drive speed at which the vibration element 115 moves the contact body 111 (moving speed of the contact body 111), constant-speed control for maintaining the drive speed (moving speed), and deceleration control for reducing the drive speed (moving speed). When the feedback control is performed, the drive frequency and the phase difference of the AC signal are controlled as described hereafter. It can be outlined that the drive speed is controlled based on the ellipse ratio when the drive speed is low and the drive speed is controlled based on the drive frequency when the drive speed is high.

When the acceleration control is started (when the drive speed is low), the ellipse ratio-determining section 307 changes the ellipse ratio according to an input of the deviation and the like from the PID controller 306. As the absolute value of the ellipse ratio is made larger, the drive speed of the vibration element 115 (moving speed of the contact body 111) becomes higher. At the start of acceleration, the drive frequency is maintained at the upper limit value set at the start of driving. After that, the drive speed increases in accordance with an increase in the ellipse ratio, and when the ellipse ratio reaches the upper limit value or the lower limit value, the frequency determining section 308 changes the drive frequency according to the input of the deviation and the like from the PID controller 306. In a state in which the ellipse ratio is the upper limit value or the lower limit value, it is possible to increase the drive speed by reducing the drive frequency.

When the constant-speed control is performed, the frequency determining section 308 determines the drive frequency according to the input of the deviation and the like from the PID controller 306. In the constant-speed control, the ellipse ratio-determining section 307 is not required to change the phase difference (ellipse ratio).

When the deceleration control is started (when the drive speed is high), the frequency determining section 308 changes the drive frequency according to the input of the deviation and the like from the PID controller 306. More specifically, the frequency determining section 308 reduces the drive speed by increasing the drive frequency. After that, when the drive frequency reaches the upper limit value, the ellipse ratio-determining section 307 determines an ellipse ratio of the elliptical motion between the upper limit value and the lower limit value, according to the input of the deviation and the like from the PID controller 306.

In a step S406, the remaining amount detection section 309 acquires a difference A (drive remaining amount) between the target stop position as the final stop position and the detected position detected by the position detection section 304.

In a step S407, the speed detection section 310 acquires an actual speed B (actual drive speed) based on the amount of change in the detected position detected by the position detection section 304.

Figure 5A:
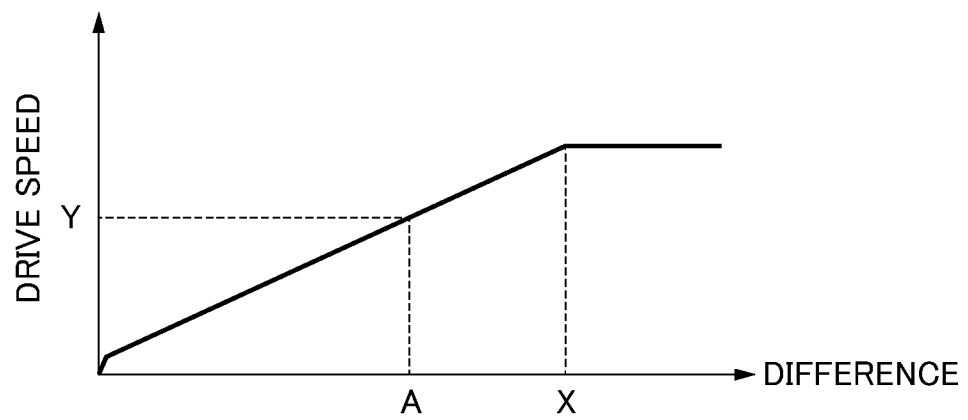
FIGS. 5A and 5B are diagrams each showing a relationship between values to be compared by a comparator of the vibration actuator.
Figure 5B:
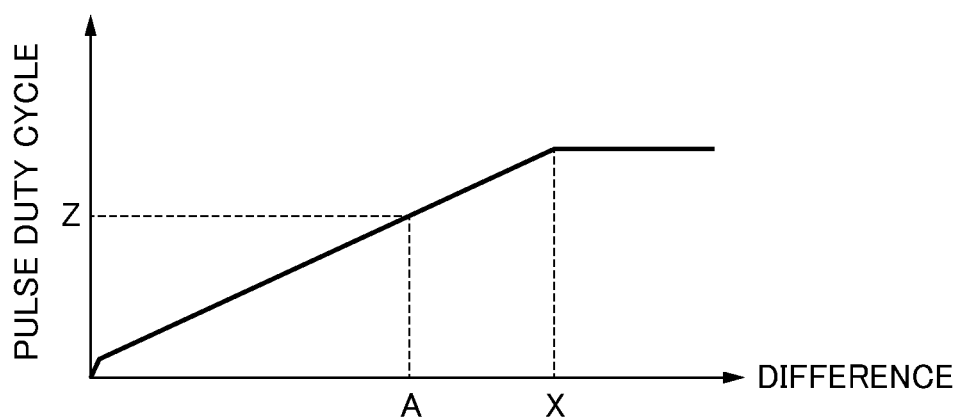

In a step S408, the comparator 311 compares the difference A input from the remaining amount detection section 309 and a threshold value X, appearing in FIG. 5A, of the difference (first threshold value). If the difference A is larger than the threshold value X (NO to the step S408), the central control unit 300 returns to the step S403 to set the command position and execute the feedback control (set the drive frequency and the phase difference based on the deviation). On the other hand, if the difference A is smaller than the threshold value X (YES to the step S408), the central control unit 300 proceeds to a step S409.

In the step S409, the comparator 311 compares the actual speed B input from the speed detection section 310 and a threshold speed Y which is a drive speed corresponding to the threshold value X appearing in FIG. 5A. If the actual speed B is lower than the threshold speed Y (NO to the step S409), the central control unit 300 returns to the step S403 to set the command position and execute the feedback control. On the other hand, if the actual speed B is higher than the threshold speed Y (YES to the step S409), the central control unit 300 proceeds to a step S410.

In the step S410, the pulse duty cycle-determining section 312 determines (reduces) the pulse duty cycle Z based on the difference A input from the remaining amount detection section 309. More specifically, as shown in FIG. 5B, the pulse duty cycle-determining section 312 determines the pulse duty cycle Z such that the pulse duty cycle Z is reduced as the difference A is smaller.

Here, let us consider a case where the difference A (drive remaining amount) is 10000 (pulses), which is smaller than the threshold value X, and the threshold speed Y corresponding to the difference A is 70 mm/s. If the detected actual speed B is 60 mm/s and hence is lower than the threshold speed Y, the pulse duty cycle is maintained without being changed. On the other hand, if the detected actual speed B is 80 mm/s and hence is higher than the threshold speed Y, the pulse duty cycle is determined to be, e.g., 20%, which is a value corresponding to the difference A (drive remaining amount).

In a step S411, the central control unit 300 determines whether or not the detected position detected by the position detection section 304 has reached a position within a target stop position range. The target stop position range is a range of positions satisfying a stop accuracy which is a predetermined accuracy required for the target stop position set in the step S402. If the detected position is not within the target stop position range (NO to the step S411), the central control unit 300 returns to the step S403 to set the command position and execute the feedback control (set the drive frequency and the phase difference based on the deviation). On the other hand, if the detected position is within the target stop position range (YES to the step S411), the central control unit 300 proceeds to a step S412.

In the step S412, the central control unit 300 terminates the above-described position feedback control operation for the relative movement unit 100 to stop the driving.

To make the detected position close to the target stop position which is the final stop position, it is preferable to control the drive speed such that the actual speed is reduced as the difference between the detected position and the target stop position is smaller. In the present embodiment, in a case where the difference A is smaller than the threshold value X (i.e., in a case where the detected position is coming closer to the target stop position) (YES to the step S408), if the deceleration is sufficient for the difference A (NO to the step S409), the pulse duty cycle is not changed. On the other hand, if the deceleration is not sufficient for the difference A (YES to the step S409), the pulse duty cycle is changed to reduce the drive speed. After that, the drive frequency and the phase difference of the AC signal are set by the feedback control, such as the PID control, based on the deviation. With the above-described configuration, the drive speed is properly reduced in a case where the detected position is coming closer to the target stop position and hence it is possible to accurately stop the relative movement unit 100 (contact body 111). Further, with the above-described configuration, it is possible to make the actual speed closer to a speed (target speed) determined according to a speed command or a position command.

In the above-described configuration for determining the pulse duty cycle based on a difference between the detected position and the target stop position, the moving speed of the contact body 111 is sometimes markedly lowered, causing stoppage of the contact body 111, due to influence of load variation caused by an environmental change, such as changes in temperature and humidity, or load unevenness depending on the driving position. To prevent this, in a case where the actual speed B detected by the speed detection section 310 becomes lower than a predetermined threshold value (second threshold value) and comes close to 0, and the detected position detected by the position detection section 304 hardly changes, it is suitable that the pulse duty cycle-determining section 312 increases the pulse duty cycle. Particularly, it is suitable that the pulse duty cycle-determining section 312 gradually increases the pulse duty cycle until the detected position changes or the actual speed B becomes higher than a predetermined threshold value (third threshold value). The above-mentioned second threshold value and third threshold value may be equal to each other or may be different from each other.

Figure 6:
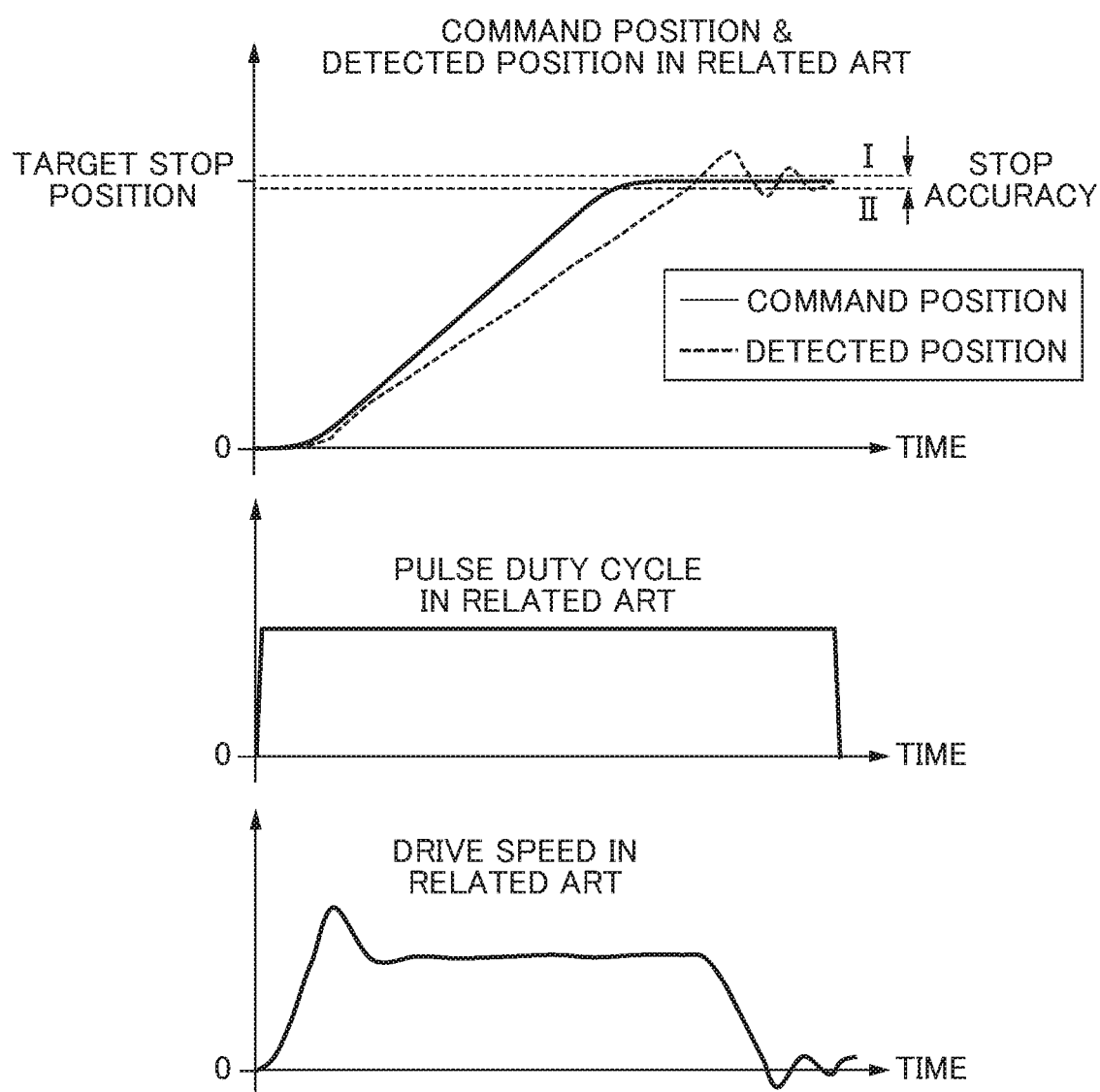
FIG. 6 is a timing diagram useful in explaining a problem of a conventional technique.
Figure 7:
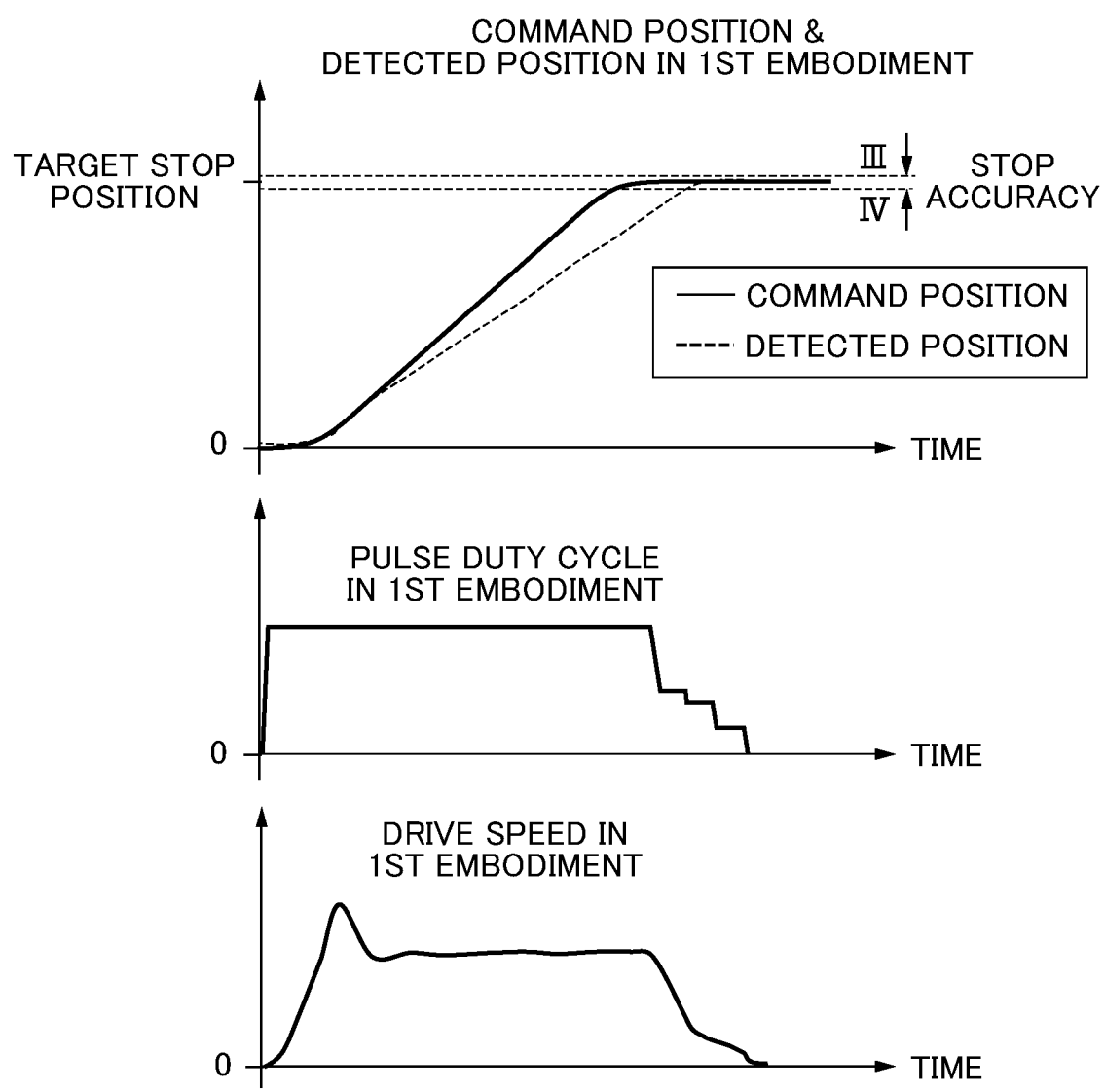
FIG. 7 is a timing diagram useful in explaining technical effects provided by the first embodiment.

The technical effects provided by the above-described control process performed by the vibration actuator 30 according to the first embodiment of the present invention will be described with reference to FIGS. 6 and 7. FIG. 6 is a diagram showing time-series changes in the command position, the detected position, the pulse duty cycle, and the drive speed, which are exhibited during the control performed by the conventional vibration actuator. FIG. 7 is a diagram showing time-series changes in the command position, the detected position, the pulse duty cycle, and the drive speed, which are exhibited during the control performed by the vibration actuator 30 according to the first embodiment of the present invention.

When the driving control is performed using the conventional technique, the drive frequency and the phase difference of the AC signal applied to the piezoelectric element are set by the position feedback control (PID control or the like) based on a deviation between the command position and the detected position of the vibration actuator. By controlling the drive frequency and the phase difference as described above, the size and the ellipse ratio of the elliptical motion excited at the protrusions of the vibration element are adjusted.

However, there is a case where when the acceleration control is performed, the actual speed does not reach a speed determined by the speed command or the position command (target speed) (the actual speed is lower than the target speed) due to the environmental conditions (such as influence of water and increase in load in a high-humidity environment or a low-temperature environment) of the vibration actuator. In such a case, when the deceleration control is performed, since the change of speed is delayed from issuance of the command of the position control, the deceleration control is prevented from effectively working, and hence the actual speed exceeds the target speed at a position where the vibration actuator is to be stopped (the actual speed is higher than the target speed).

As a result, as shown in FIG. 6, the vibration actuator (i.e., the contact body 111) passes (overshoots) the target stop position without stopping, and an operation for returning the vibration actuator (i.e., the contact body 111) by the exceeding amount in an opposite direction to the driving direction is required. If the returning operation is executed, a time required until the position of the contact body 111 converges within the target stop position range (range between broken lines I and II in FIG. 6) satisfying a predetermined stop accuracy with respect to the target stop position is increased.

In the driving control according to the first embodiment of the present invention, the drive frequency and the phase difference of the AC signal applied to the piezoelectric element 114 are set by the position feedback control (PID control or the like) based on a deviation between the command position and the detected position of the relative movement unit 100. In addition, the pulse duty cycle of the relative movement unit 100 is set based on the difference A (drive remaining amount) between the target stop position and the detected position of the relative movement unit 100 and the actual speed B. The size of the elliptical motion (particularly, the amplitude of the elliptical motion in a direction orthogonal to the driving direction) excited at the protrusions 112 of the vibration element 115 is adjusted by setting the pulse duty cycle. That is, in the present embodiment, not only the size and the ellipse ratio of the elliptical motion are adjusted according to the deviation between the command position and the detected position, but also the size (amplitude) of the elliptical motion is adjusted according to the difference A between the target stop position and the detected position and the actual speed B.

In the above-described driving control according to the present embodiment, the driving is controlled such that the frictional force between the contact surfaces of the vibration element 115 and the contact body 111 gradually increases with respect to the driving force of the relative movement unit 100. The braking force generated by friction reduces the influence of inertia, and hence compared with the conventional technique, it is possible to reduce the excess (overshoot) with respect to the target stop position as shown in FIG. 7. Further, execution of the returning operation for canceling the excess is reduced, and hence it is possible to reduce a time required until the position of the contact body 111 converges within the target stop position range (range between broken lines III and IV in FIG. 7) satisfying the predetermined stop accuracy with respect to the target stop position, and it is possible to realize the stop operation with higher accuracy.

In the above-described embodiment, the relative movement unit 100 is configured such that the vibration element 115 is fixed and the contact body 111 is driven in the X-direction. However, the relative movement unit 100 configured such that the contact body 111 is fixed and the vibration element 115 is moved by driving the vibration element 115 may be employed. That is, the present invention can be applied to a desired vibration actuator configured such that the vibration element 115 and the contact body 111 are moved relative to each other by driving the vibration element 115.

Further, although in the above-described embodiment, the drive controller 301 functions as a controller, the central control unit 300 and the drive controller 301 may cooperate with each other to function as a controller.

Next, a description will be given of a relative movement unit 100A of a vibration actuator according to a second embodiment of the present invention with reference to FIG. 8. Note that in the following embodiments described below by way of example, components that operate and function similarly to those of the first embodiment will be denoted by the same reference numerals used in the above description, and description thereof is omitted as appropriate.

Figure 8:
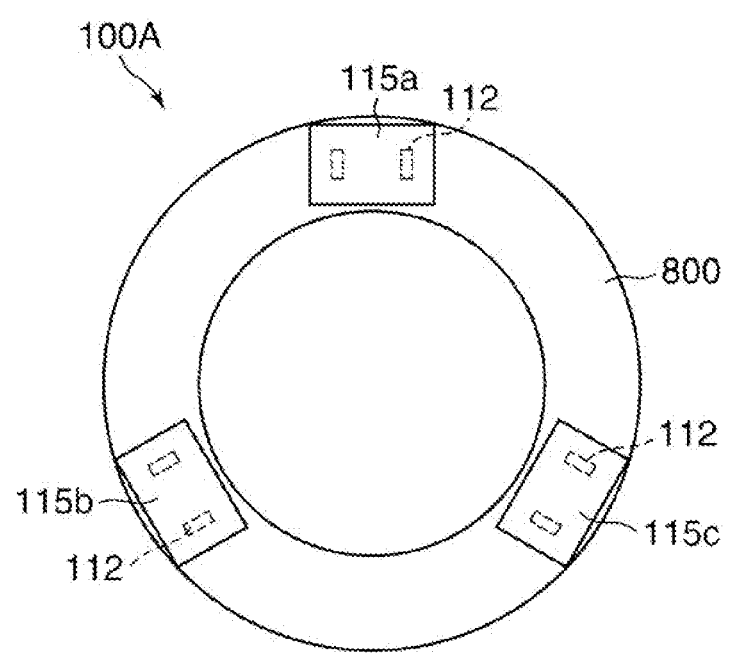
FIG. 8 is a view useful in explaining a relative movement unit of a vibration actuator according to a second embodiment of the present invention.

As shown in FIG. 8, the relative movement unit 100A includes an annular contact body 800 and three vibration elements 115a, 115b, and 115c arranged at substantially equally-spaced intervals in a circumferential direction of the contact body 800. The vibration elements 115a, 115b, and 115c each have the same configuration as that of the vibration element 115 of the first embodiment. The three vibration elements 115a, 115b, and 115c are each arranged on a base, not shown, such that a straight line connecting centers of the two protrusions 112 is tangential to a circle concentric to an inner peripheral circle or an outer peripheral circle of the contact body 800.

In the above-described configuration, by simultaneously exciting vibrations of the mode A and vibrations of the mode B in the vibration elements 115a, 115b, and 115c, it is possible to drive the contact body 800 for rotation (or it is possible to rotate the vibration elements 115a, 115b, and 115c with respect to the contact body 800).

Figure 9:
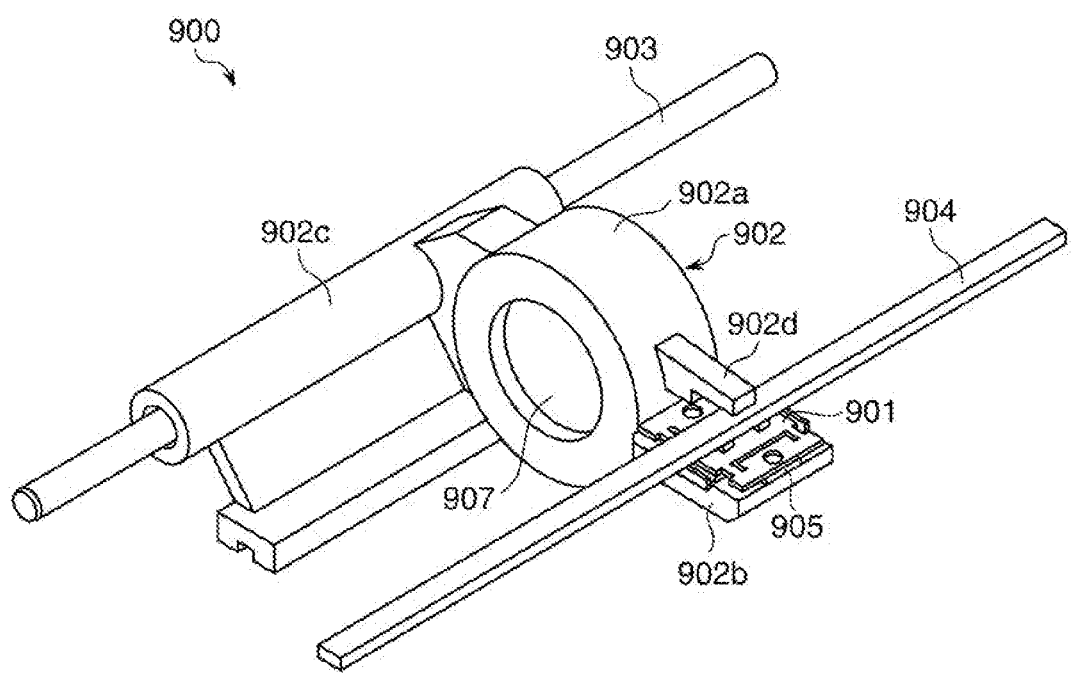
FIG. 9 is a perspective view of a driving mechanism section of an image capture apparatus including the relative movement unit of the vibration actuator according to the first embodiment.

Next, a description will be given of an image capture apparatus (optical apparatus), such as a camera, to which is applied the relative movement unit 100 of the vibration actuator according to the above-described first embodiment, with reference to FIG. 9. FIG. 9 is a perspective view showing a general structure of a driving mechanism section 900 arranged in a lens barrel included in the image capture apparatus. The image capture apparatus includes the lens barrel, and an image capture device, such as a CMOS image sensor, arranged on an optical axis of the lens barrel. Note that the lens barrel may be integrally formed with the image capture apparatus or may be attachable to the image capture apparatus.

The driving mechanism section 900 includes a lens holder 902, a vibration element 901 that drives the lens holder 902, a first guide bar 903, a second guide bar 904, a pressurizing magnet 905, and a base, not shown.

The vibration element 901 is configured similarly to the vibration element 115 according to the first embodiment.

The lens holder 902 includes a main body portion 902a, a holding portion 902b, an engagement portion 902c, and a drop-off prevention portion 902d. The main body portion 902a is formed into a substantially cylindrical shape and holds a lens 907. The holding portion 902b holds the vibration element 901 and the pressurizing magnet 905. The vibration element 901 and the lens holder 902 are connected by the holding portion 902b. The engagement portion 902c is engaged with the first guide bar 903 and forms a first guide unit with the first guide bar 903.

The first guide bar 903 and the second guide bar 904 are arranged substantially in parallel with each other. Opposite ends of the first guide bar 903 and opposite ends of the second guide bar 904 are fixed to the base, not shown, respectively. The second guide bar 904 functions as the above-described contact body 111.

The pressurizing magnet 905 includes a permanent magnet and two yokes arranged at opposite ends of the permanent magnet and functions as pressing means. A magnetic circuit is formed between the pressurizing magnet 905 and the second guide bar 904, whereby an attraction force is generated between the pressurizing magnet 905 and the second guide bar 904. The vibration element 901 is held such that the tip ends of the two protrusions 112 thereof are pressed against the second guide bar 904 with a predetermined magnitude of force, whereby a second guide unit is formed.

There is a clearance between the pressurizing magnet 905 and the second guide bar 904 and hence they are in a non-contact relationship with each other. However, even when an external force acts in a direction in which the protrusions 112 of the vibration element 901 and the second guide bar 904 (contact body 111) are moved away from each other, the drop-off prevention portion 902d is brought into contact with the second guide bar 904, whereby the holding portion 902b returns to the original position. As a result, the state in which the protrusions 112 of the vibration element 901 and the second guide bar 904 are in contact with each other is maintained.

Similar to the first embodiment, by applying an alternating voltage to the vibration element 901, elliptical motion is generated at the two protrusions 112, whereby a frictional driving force is generated between the vibration element 901 and the second guide bar 904. As described hereinabove, since the first guide gar 903 and the second guide bar 904 are fixed, it is possible to move the lens holder 902 along the extending direction of the guide bars 903 and 904 with the generated frictional driving force.

Although in the image capture apparatus described here, the pressurizing magnet 905 having a magnetic force is used as a pressurization mechanism, this is not limitative, but a desired pressurization mechanism (such as a spring having an urging force) can be used.

Although in the image capture apparatus described here, the driving mechanism section 900 is configured as a linear-type vibration drive device, this is not limitative, and the driving mechanism section 900 can be configured, for example, as such a rotary-type vibration drive device as described in the second embodiment. In this variation, an annular member that holds the lens is rotated by a rotational force of the contact body 800. Rotation of the annular member is converted to linear movement in the optical axis direction using a conversion mechanism having a structure in which a cam pin and a cam groove are engaged with each other, whereby it is possible to move the lens in the optical axis direction.

The vibration drive device is suitable for driving a lens for automatic focusing and is also suitable for a lens for zooming. Further, the vibration drive device is also suitable for driving an image capture device on which light incident through the lens is imaged, or driving the lens or the image capture device in camera-shake correction.

As a variation of the first embodiment, in the relative movement unit 100, a plurality of vibration elements 115 may be arranged for the bar-shaped contact body 111, or as a variation of the second embodiment, in the relative movement unit 100A, two or four or more vibration elements 115 may be arranged for the annular contact body 800.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-132793 filed Jul. 18, 2019, which is hereby incorporated by reference herein in its entirety.

What is claimed is:

1. A controller that drives a vibration element including an electromechanical energy conversion element by an AC signal to thereby move a contact body, which is in contact with the vibration element, relative to the vibration element,
wherein the controller is configured to control a pulse duty cycle of a signal converted to the AC signal based on a difference between a target stop position, which is a final stop position of the contact body, and a current position of the contact body, and an actual speed of the contact body.

2. The controller according to claim 1, wherein the controller is configured to change the pulse duty cycle in a case where the difference is smaller than a predetermined threshold value and also the actual speed is higher than a predetermined threshold speed.

3. The controller according to claim 2, wherein the controller is configured to reduce the pulse duty cycle as the difference decreases.

4. The controller according to claim 1, wherein the controller is configured to adjust a size of elliptical motion excited at protrusions included in the vibration element, by controlling the pulse duty cycle.

5. The controller according to claim 4, wherein the controller is configured to adjust an amplitude of the elliptical motion in a direction orthogonal to a direction of driving the vibration element, by controlling the pulse duty cycle.

6. The controller according to claim 1, wherein the controller is configured to control a drive frequency and a phase difference of the AC signal by performing feedback control based on a deviation between a command position which is a temporary target position of the contact body and the current position.

7. The controller according to claim 1, wherein the controller is configured to increase the pulse duty cycle in a case where the actual speed is lower than a predetermined first threshold value.

8. The controller according to claim 7, wherein the controller is configured to increase the pulse duty cycle until the actual speed becomes higher than a predetermined second threshold value.

9. A vibration actuator comprising:
a vibration element; and
the controller, as claimed in claim 1, which is configured to control driving of the vibration element.

10. A vibration actuator comprising:
a contact body formed into an annular shape;
a plurality of vibration elements arranged at substantially equally-spaced intervals in a circumferential direction of the contact body; and
the controller, as claimed in claim 1, which is configured to control driving of each vibration element,
wherein control of driving of each vibration element by the controller causes the contact body to rotate relative to the vibration elements.

11. An image capture apparatus which includes a lens barrel or is capable of having a lens barrel attached thereto, comprising:
an image capture device arranged on an optical axis of the lens barrel; and
the vibration actuator, as claimed in claim 9, which is configured to drive a lens included in the lens barrel.

12. An image capture apparatus which includes a lens barrel or is capable of having a lens barrel attached thereto, comprising:
an image capture device arranged on an optical axis of the lens barrel; and
the vibration actuator, as claimed in claim 10, which is configured to drive a lens included in the lens barrel.

13. A control method for driving a vibration element including an electromechanical energy conversion element by an AC signal to thereby move a contact body, which is in contact with the vibration element, relative to the vibration element, comprising:
controlling a pulse duty cycle of a signal converted to the AC signal based on a difference between a target stop position, which is a final stop position of the contact body, and a current position of the contact body, and an actual speed of the contact body.

* * * * *